June 4, 1968 F. H. DURGIN 3,386,780
PAIR OF FLEXURAL PIVOTS WITH BUILT-IN DAMPING
Filed May 27, 1966 2 Sheets-Sheet 1

INVENTOR
Frank H Durgin

J. O. Tresansky
ATTORNEY

James H. O'Neill
AGENT

BY

June 4, 1968    F. H. DURGIN    3,386,780
PAIR OF FLEXURAL PIVOTS WITH BUILT-IN DAMPING
Filed May 27, 1966    2 Sheets-Sheet 2
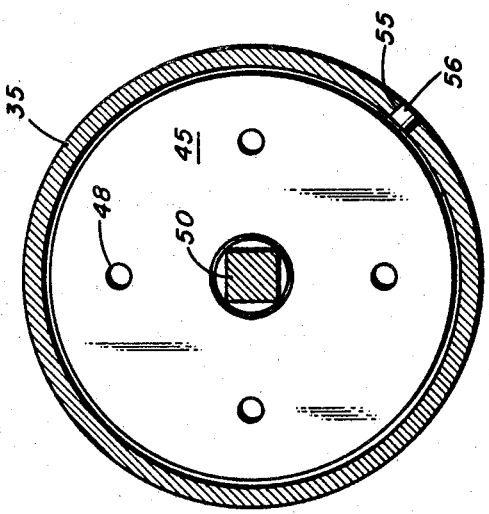
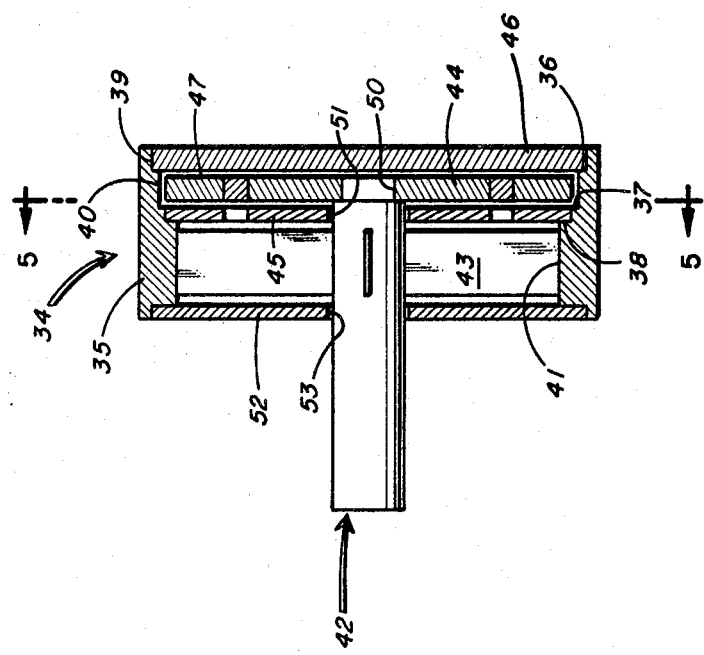
INVENTOR
Frank H. Durgin
BY
ATTORNEY
AGENT

United States Patent Office 3,386,780
Patented June 4, 1968

3,386,780
PAIR OF FLEXURAL PIVOTS WITH
BUILT-IN DAMPING
Frank H. Durgin, Belmont, Mass., assignor, by mesne assignments, to the United States of America as represented by the Secretary of the Navy
Filed May 27, 1966, Ser. No. 554,294
10 Claims. (Cl. 308—2)

ABSTRACT OF THE DISCLOSURE

A flexural pivot assembly having an inclosed fluid containing chamber spaced from the flexure members to receive a disc on the shaft of the assembly to provide a predetermined damped motion about the shaft's axis of rotation.

---

This invention relates to oscillatory pivots and more particularly to damped flexural pivots.

Flexural pivots are known which are used in pairs to mount a gage; those pivots previously used with force balancing gages have had little or no damping because of the rigidity of the pivot in all directions except for rotation about its axis. These flexural pivots proved to be of little value when used in hypersonic wind tunnels, since they could not accurately measure the forces when the gage was used in several positions and it was found that a larger degree of damping was necessary. Furthermore, with no damping these flexural pivots allowed no axial movement, thereby causing damage to the gage when an axial force was applied thereto.

Prior pivots are known which permit oscillation practically free of friction. However, the known arrangements of this type fail to show a pivot which incorporates a means of damping the desired motion about the axis of rotation. There existed the need for a flexural pivot having a predetermined damped motion about its axis of rotation, and a sufficiently small restoring moment due to the flexures, to allow a measurement of very small moments, yet rugged enough that extraneous moments about axes other than the axis of rotation and any forces along or through the axis of rotation would not effect any measurements made using the pivot.

It is therefore an object of this invention to provide a flexural pivot which has built into it a known desired amount of damping for rotation about the desired axis of rotation.

It is another object of this invention that the flexural pivot be highly resistant to all motion except rotation about the desired axis of rotation.

It is still another object of this invention that the means of damping shall increase considerably the flexural pivot's resistance to axial motion.

With these objects in view the present invention mainly consists in a suspension arrangement for oscillation about an axis. A shaft is suspended coaxially within an outer ring by means of four flexure straps spaced apart uniformly about the common axis of the shaft and the ring. Damping about the axis of rotation is provided by a disc attached to the shaft and positioned between parallel plates mounted upon the outer ring, with a viscous fluid disposed between the disc and the plates.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

FIG. 4 is a cross sectional view of another embodiment of the flexural pivot of the present invention; and FIG. 5 is a sectional view taken on line 5—5 of FIG. 4.

Figure 1:
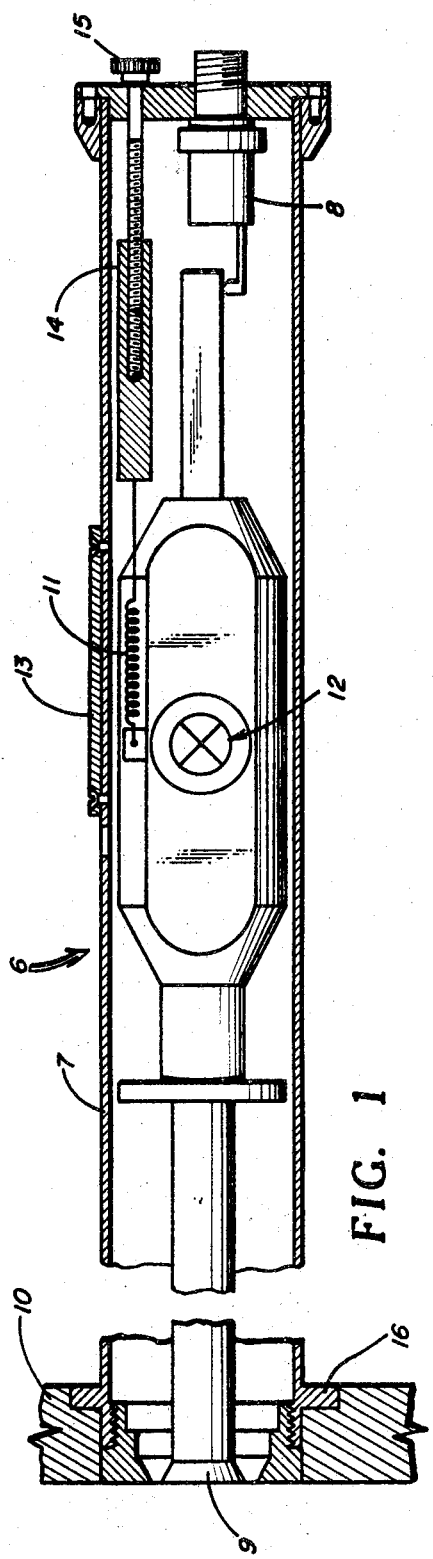
FIG. 1 is a cross sectional view of a skin friction balance showing the flexural pivot of the present invention.

Referring now to FIG. 1 of the drawings, there is shown a skin friction balance 6 embodying a pair of flexural pivots of the present invention. It will be understood, of course, that the flexural pivots need not be used in the balance, but may be used in any device that needs the desired flexural and damping features of the present invention.

As shown in FIG. 1, the skin friction balance has an elongated tubular body 7 containing at one end a linear variable transformer 8 which senses the position of a measuring head 9 as it moves to an equilibrium position under the action of the skin friction force on the wind tunnel wall 10 and the restraining forces of the preloading spring 11 and two flexure pivots 12. The measuring head 9 is supported by the flexural pivots 12 containing built-in damping. As air from the wind tunnel passes across the top surface of the measuring head, the flexural pivots rotate. The calibrated spring 11 is used to provide a restoring moment on the balance to restore the measuring head to its original position. The force exerted by the spring may be used to calculate the skin friction force. The damping provided by the flexures eliminates the effect of wind tunnel vibrations on the gage. The preloading spring may be inspected or removed through the side of the tubular body by removing a cover plate 13. The force of the preloading spring is initially set by adjusting the spring preloader 14 through the adjusting nut 15.

The skin friction balance is mounted in the wall of a wind tunnel and held in place by four screws 90° apart through flange 16, as shown at the left hand end of FIG. 1. Different modes of mounting the balance on the wind tunnel as well as different means of sensing the position of the measuring head will be obvious to those skilled in the art and will not effect the operation of the flexural pivots.

It is noted, that to achieve a successful direct measurement of skin friction, the force must be accurately resolved in a background of much larger extraneous forces. The abovementioned balance helps to isolate the force to enable more accurate measurement of the skin friction.

Figure 3:
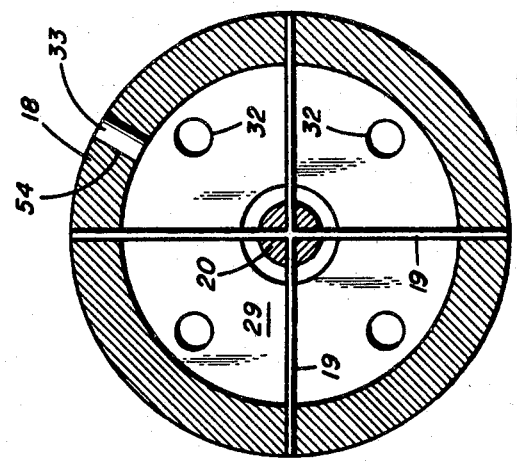
FIG. 3 is a sectional view taken on line 3—3 of FIG. 2.
Figure 2:
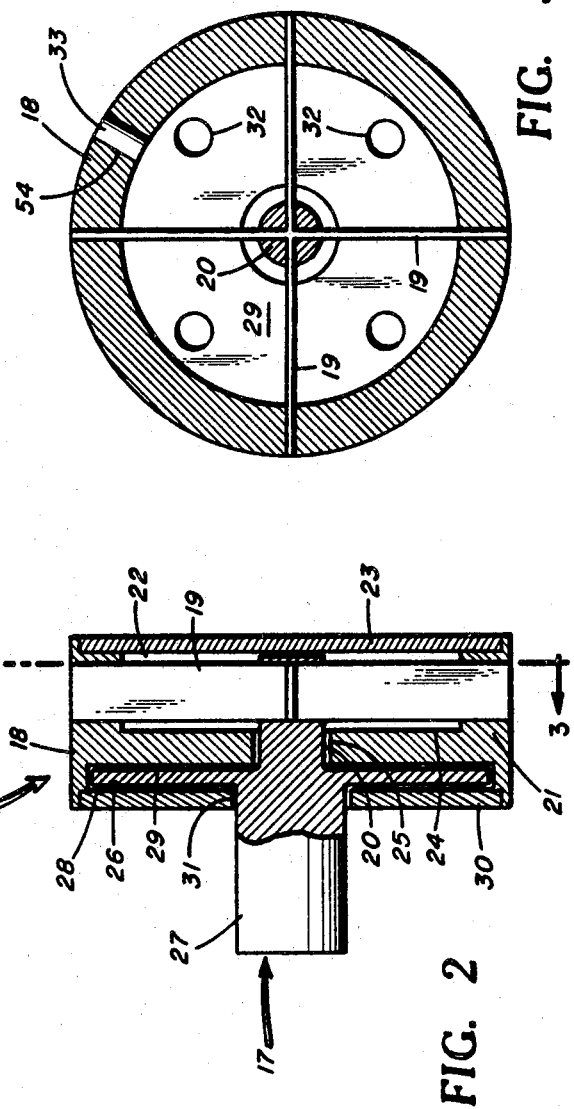
FIG. 2 is a cross sectional view of a preferred embodiment of the flexural pivot of the present invention.

Referring now to FIGS. 2 and 3, a preferred embodiment of the flexural pivot to be used in the balance is indicated at 12. A cylindrical shaft 17 is suspended in a circular housing 18 by a plurality of radially extending stainless steel flexures or flexural straps 19, preferably four in number spaced 90° apart. These flexures are attached at one end to a reduced portion 20 of the shaft 17 and at the other end to an outer ring portion 21 formed on the housing 18. A flexure chamber 22 having contained therein the flexures 19 is formed by the outer ring 21, a cover plate 23 sealingly attached to a reduced portion in the outer ring and a wall 24 perpendicular to the outer ring. The reduced portion 20 of the shaft extends into the flexure chamber 22 through a bore 25 formed in the wall 24. A damping disc 26, formed integral with shaft 17 between the reduced portion 20 and an enlarged portion 27, acts within a damping chamber 28 formed within the housing 18 by a perpendicular wall 29 and a cover plate 30 fixed to the end of the housing. The enlarged portion 27 of the shaft extends through bore 31 formed in cover plate 30 and may be attached to either a fixed or movable part of a device, while the outside of the circular housing 18 may be attached to the other part.

Cover plates 23 and 30 are preferably fixed to the housing by soft solder while the flexures 19 are fixed to shaft 17 and the outer ring 21 by silver solder.

Damping chamber 28 is filled with a highly viscous fluid, e.g., Dow Corning silicon fluid with a viscosity of $0.5 \times 10^6$ centistokes. The chamber is filled with the silicon fluid by placing the flexure pivot into the fluid in an evacuated chamber and then allowing atmospheric pressure to fill the chamber through hole 54 in the circular housing 18 and thence through holes 32 formed in wall 29. Hole 54 is then closed by plug 33.

To produce a reliable damped flexure pivot the damping should be made nearly critical. This is achieved by using the viscous fluid (500,000 centistokes) and by keeping the gap between the disc and the walls very small, approximately 0.10 inch.

The diameters of the shaft portions 20 and 27 and bores 25 and 31 are machined so that the shaft is capable of turning in the bores but the silicon fluid is unable to leak out. The spaces shown in the drawing are overly exaggerated and are not meant to show the true relationship of these elements.

Referring now to FIGS. 4 and 5, another embodiment of the flexural pivot to be used in the balance is indicated at 34. In this embodiment a circular hollow housing 35 having a stepped bore with shoulders 36, 37 and 38 and diameters 39, 40 and 41, encloses a cylindrical shaft 42 having a plurality of flexures 43 attached to both the housing and the shaft. In this case the circular housing 35, the flexures 43, and the shaft 42 are made from one piece of material, stainless steel preferably. A plate 45 is forced fitted into an abutting relationship with shoulder 38 to separate the damping disc 38, which is attached to the shaft 42, from the flexure elements. An end plate 46 abutting shoulder 36 is held in the housing at 39 and forms with plate 45 and diameter 40 an enclosed damping chamber 47. Chamber 47 is filled with a viscous damping fluid through a plurality of holes 48 formed in plate 45, and hole 55 in the outer ring 35 (FIG. 5) by the method mentioned above. Plug 56 is then used to plug hole 55.

Damping disc 44 is attached to shaft 42 at a reduced rectangular portion 50 and is held thereto by a shrink fit. The enlarged portion of the shaft extends through a bore 51 in plate 45 and out of the bearing housing through bore 53 formed in end plate 52 fixed to the housing.

In operation, these flexural pivots allow oscillation around the axis of their shafts and almost no axial or transverse movement due to the damping disc and chamber. The viscosity of the fluid used in the damping chamber may be varied, if considered desirable in a given application of the pivot.

The rotational stiffness of the shaft, of the present invention, with respect to the outer ring or housing is a function of both the bending stiffness of and the tension in the flexures. For the purposes of calculation of the preferred stiffnesses the two were assumed independent and additive. Using these calculations pivots can be built which have a ±1 percent accuracy at the minimum measurable skin friction force. Therefore, before a pivot is built the thickness of the metal, preferably stainless steel, to be used in the flexures can be calculated, as well as the tension to be applied to the prestressed flexures. The thickness as well as the length of the flexures also determines the angle through which the pivot may oscillate and may be determined before construction of the final assembly.

The damping means not only dampens the rotational motion about the axis, but also acts to prevent any axial motion and highly damps any transverse motion. It acts as a cushion to prevent vibration from reaching the meter.

It is apparent that many changes and modifications could apparently be made in the above constructions by one skilled in the art, including the drilling of holes in the damping discs to control the degree of damping of the pivots, without departing from the scope of the invention. It is intended that all matters contained in the above description or shown in the accompanying drawings shall not be construed as limiting but to be comprehended within the meaning and range of equivalence of the following claims.

What is claimed is:
1. A flexural pivot comprising,
    a housing,
    a shaft contained within said housing,
    a plurality of flexures connecting said shaft to said housing to allow oscillation of said shaft,
    a damping chamber formed in said housing,
    a damping disc fixed to said shaft and acting within said chamber,
    end plates fixed to said housing to completely enclose said flexures and said disc; and
    a fluid contained within said damping chamber to provide damping of said disc.
2. The flexural pivot of claim 1, wherein said damping disc is integral with said shaft.
3. The flexural pivot of claim 2, in which said damping chamber is formed by a wall integral with said housing and a first end plate through which said shaft extends.
4. The flexural pivot of claim 3, wherein said flexures are fixed to a reduced portion of said shaft.
5. The flexural pivot of claim 4, in which said flexures are contained within a flexure chamber formed in the end of said housing opposite from that which said shaft extends.
6. The flexural pivot of claim 1, in which said flexures are contained within a flexure chamber formed in the end of said housing from which said shaft extends.
7. The flexural pivot of claim 3, wherein said wall has a plurality of holes whereby the damping chamber may be initially filled with fluid through a plugged hole in said housing.
8. The flexural pivot of claim 1, in which said damping disc is attached to said shaft by shrink fitting on the end thereof.
9. The flexural pivot of claim 8, wherein said damping chamber is formed by a plate force fitted in a stepped bore between the damping and flexure chambers and an end cover-plate also force fitted in the stepped bore.
10. The flexural pivot of claim 9, in which said flexures, said housing and said shaft are integrally made from a single piece of material.

References Cited

UNITED STATES PATENTS

| | | | |
|---|---|---|---|
| 2,021,168 | 11/1935 | Borden | 308—2 X |
| 2,857,764 | 10/1958 | Frank | 73—462 |
| 3,184,928 | 5/1965 | Desai | 308—2 X |
| 3,312,458 | 4/1967 | Bratt | 308—2 X |

MARTIN P. SCHWADRON, *Primary Examiner.*

L. L. JOHNSON, *Assistant Examiner.*